United States Patent
Maruyama

(10) Patent No.: US 7,227,660 B2
(45) Date of Patent: Jun. 5, 2007

(54) COMMUNICATION APPARATUS, TRANSMISSION PROGRAM, COMPUTER READABLE MEDIUM STORING A TRANSMISSION PROGRAM, TRANSMISSION METHOD AND COMMUNICATION SYSTEM FOR RELIABLY TRANSMITTING IMAGE DATA

(75) Inventor: Teruyuki Maruyama, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 974 days.

(21) Appl. No.: 10/055,357

(22) Filed: Jan. 23, 2002

(65) Prior Publication Data

US 2002/0118397 A1    Aug. 29, 2002

(30) Foreign Application Priority Data

Jan. 31, 2001    (JP)    ............................. 2001-023605

(51) Int. Cl.
*G06F 15/00*    (2006.01)
(52) U.S. Cl. ..................... 358/1.15; 358/405; 358/403; 358/407; 358/440
(58) Field of Classification Search ............... 358/405, 358/403, 404, 407, 440, 1.15
See application file for complete search history.

(56) References Cited

U.S. PATENT DOCUMENTS

| | | | |
|---|---|---|---|
| 4,581,656 A | | 4/1986 | Wada |
| 5,459,584 A | | 10/1995 | Gordon et al. |
| 5,539,530 A | * | 7/1996 | Reifman et al. ............. 358/402 |
| 6,020,980 A | * | 2/2000 | Freeman ..................... 358/402 |
| 6,115,141 A | * | 9/2000 | Kim ........................... 358/404 |
| 6,377,976 B1 | * | 4/2002 | Nitta et al. .................. 709/204 |
| 6,950,213 B1 | * | 9/2005 | Gurevich .................... 358/401 |
| 2002/0126321 A1 | * | 9/2002 | Trachtman .................. 358/407 |

FOREIGN PATENT DOCUMENTS

| | | |
|---|---|---|
| EP | 0360732 A2 | 9/1989 |
| EP | 0610875 A1 | 2/1994 |

OTHER PUBLICATIONS

U.S. Appl. No. 09/559,076, filed Apr. 27, 2000.

* cited by examiner

Primary Examiner—Kimberly A. Williams
Assistant Examiner—Michael Burleson
(74) Attorney, Agent, or Firm—Cooper & Dunham LLP

(57) ABSTRACT

A communication apparatus includes receiving means for receiving image data and accompanying communication information, primary storage means for temporarily storing them, secondary storage means having a greater storage capacity than the primary storage means, forwarding means for converting the image data to a standard format and forwarding it with the communication information, network communication means for transmitting the standard format image data with the communication information to the server apparatus. The communication apparatus further includes retransmitting means operable in case of a failure of transmission. The retransmission means saves the image data and communication information stored in the primary storage means in the secondary storage means, deletes the image data from the primary storage means, converts the saved image data into a standard format, retransmits the standard format image data to the server apparatus with the communication information and repeats retransmission in case of a failure of the preceding retransmission.

4 Claims, 7 Drawing Sheets

FIG. 7

| | 31 | 32 |
|---|---|---|
| aaa@xxx.yyy.co.jp | 0123 | -1 |
| bbb@xxx.yyy.co.jp | 1234 | -1 |
| ccc@xxx.yyy.co.jp | -1 | 12345678 |
| ddd@xxx.yyy.co.jp | -1 | 11111111 |
| eee@xxx.yyy.co.jp | -1 | 09876543 |

24

COMMUNICATION APPARATUS, TRANSMISSION PROGRAM, COMPUTER READABLE MEDIUM STORING A TRANSMISSION PROGRAM, TRANSMISSION METHOD AND COMMUNICATION SYSTEM FOR RELIABLY TRANSMITTING IMAGE DATA

BACKGROUND OF THE INVENTION

1. Field of the Invention

The present invention generally relates to a communication apparatus for receiving data through a public telephone line and transmitting the received data to a server apparatus via a network, and particularly relates to a communication apparatus such as a facsimile apparatus or a composite machine capable of transmitting the received data at a high speed, a data transmission program that can be executed on such a communication apparatus, a recording medium whereon such a data transmission program is stored and a data transmission method which can be implemented in such a communication apparatus.

2. Description of the Related Art

In an environment such as an office environment, it is often a case that facsimile documents are received by a communication apparatus such as a facsimile apparatus and transmitted to addressees. Recently, in order to deal with such a case, a system has been developed and produced that transmits facsimile documents and accompanying communication information such as a confidential ID and an F-code to a server apparatus having a facsimile communication capability using an internal transfer function via a network such as a LAN (Local Area Network) and subsequently distributes them from the server apparatus to each person by an e-mail message or allocates them to predetermined folders.

In such a communication apparatus that transmits the facsimile documents to the server apparatus, the facsimile document received via the telephone line is stored together with the communication information in a memory having a small storage capacity and adapted for high-speed forwarding. Then the received document stored in the memory is converted to a standard format document and transmitted to the server apparatus together with the communication information.

However, with such a communication apparatus of the related art, the received documents are transmitted to the server apparatus via the memory having a small storage capacity. Therefore, when the transmission rate of the communication line between the communication apparatus and the server apparatus is slower than that of the communication line of the facsimile apparatus of the sending party, or, when the server apparatus is communicating with another apparatus and thus a communication cannot be established between the communication apparatus and the server apparatus, the memory will overflow and further facsimile documents cannot be received.

SUMMARY OF THE INVENTION

Accordingly, it is a general object of the present invention to provide a communication apparatus for transmitting image data and communication information attached thereto, such as a confidential ID, to a server apparatus via a high-speed network and distributing them from the server apparatus to each person by an e-mail message or allocating them to predetermined folders, thus obviating the problems described above.

It is another and more specific object of the present invention to provide such a communication apparatus in which, even in case of failing to transmit the received document to the distribution server apparatus, the image data and communication information can still be received in a reliable manner. In order to achieve such reliable reception, the received image data and communication information stored in a primary storage means is saved in a secondary storage means having a large storage capacity and then the received image data and communication information in the primary storage means is deleted to free the storage area in the primary storage means.

In order to achieve the above objects, a communication apparatus includes:

receiving means for receiving image data and accompanying communication information;

primary storage means for temporarily storing the image data and communication information, the primary storage means being adapted for high-speed forwarding;

secondary storage means having a storage capacity greater than that of the primary storage means;

forwarding means for converting the image data to a standard format and forwarding the standard format image data together with the communication information;

network communication means connected to a server apparatus via a network for transmitting the standard format image data together with the communication information to the server apparatus.

The communication apparatus also includes retransmitting means operable in case of a failure of transmission. The retransmitting means saves the image data and communication information stored in the primary storage means in the secondary storage means, deletes the image data from the primary storage means, converts the saved image data into a standard format, retransmits the standard format image data together with the communication information to the server apparatus and repeats retransmission in case of a failure of the preceding retransmission.

According to the present invention, subsequent data can be received in a reliable manner. Also, when it is possible to communicate with the server apparatus, the image data stored in the secondary storage device is converted to a standard format and can be immediately transmitted together with the communication information to the server apparatus.

Also, when the primary storage means is constituted as an SAF (Store and Forward) memory and the secondary storage means is constituted as a hard disk, the image data together with the communication information can be transmitted at a high speed to the server apparatus via a fast network. Accordingly, time required for distributing image data from the server apparatus to each destination (each person) is considerably reduced and sufficient storage area can be reserved for saving image data.

The present invention also relates to a transmission program for image data, a recording medium whereon the transmission program is stored and a method of transmission of image data for achieving the above object.

BRIEF DESCRIPTION OF THE DRAWINGS

FIG. 7 is a diagram showing a distribution table stored in the server apparatus according to the present invention.

DETAILED DESCRIPTION OF THE PREFERRED EMBODIMENTS

In the following, principles and embodiments of the present invention will be described with reference to the accompanying drawings.

FIGS. 1 through 7 are diagrams showing an embodiment of the present invention in various forms such as a communication system, a communication apparatus, a transmission program for image data, a recording medium storing a transmission program and a transmission method for image data. In the following description, a facsimile apparatus is taken as an example of the communication apparatus, but the communication apparatus may be any apparatus capable of performing a communication function.

Figure 1:
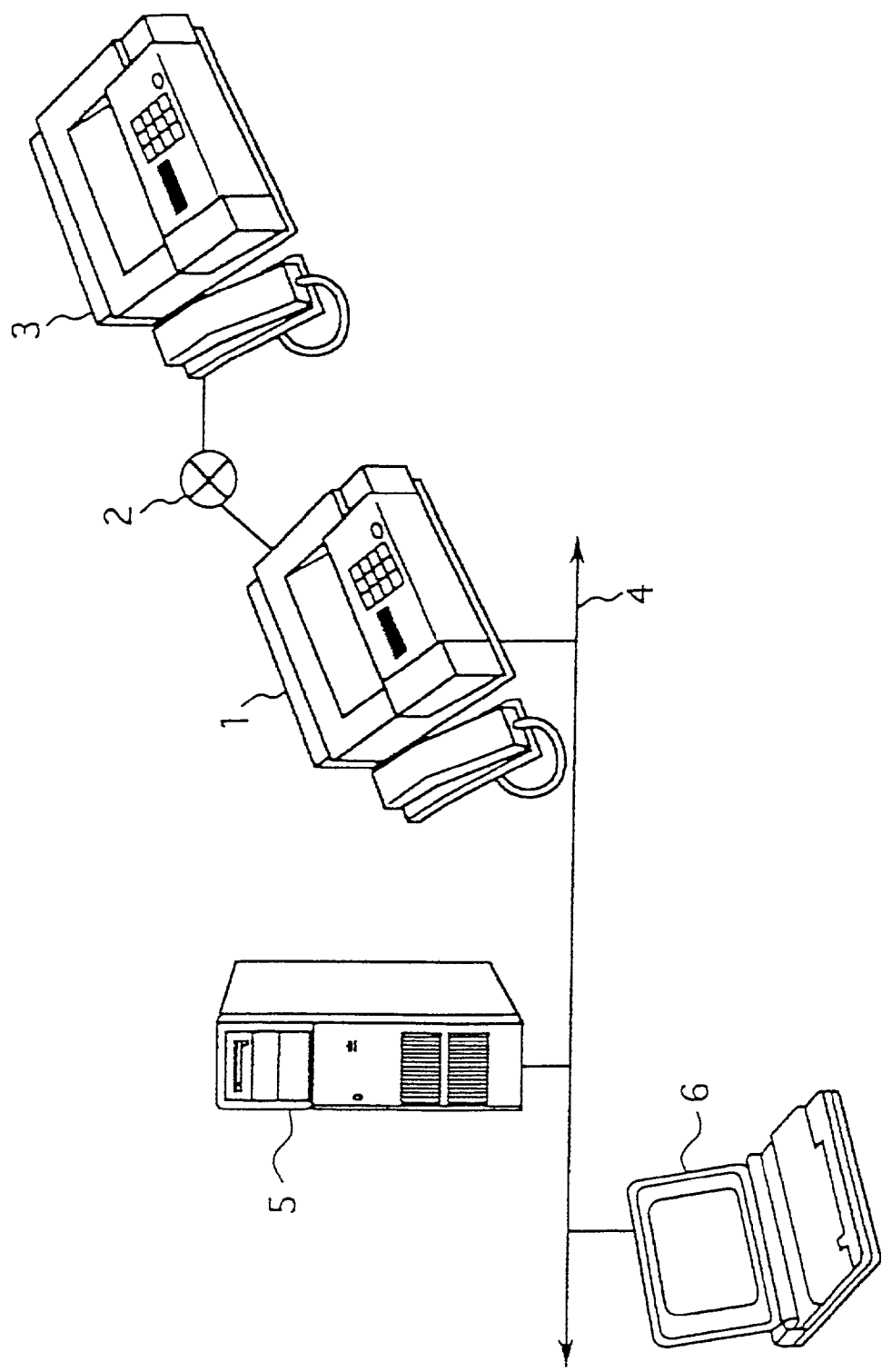
FIG. 1 is a schematic diagram showing a system of the present invention.

First, a configuration of the present invention will be described. FIG. 1 is a system configuration diagram of the present invention. As shown in FIG. 1, the system includes a facsimile apparatus 1 serving as a communication apparatus that is connected to a facsimile apparatus 3 of the other party via a public telephone line 2. The facsimile apparatus 1 is connected to a network 4 such as a LAN (Local Area Network) whereto a server apparatus 5 and client PCs (Personal Computers) 6 are connected. The network may be another network such as the Internet.

Figure 2:
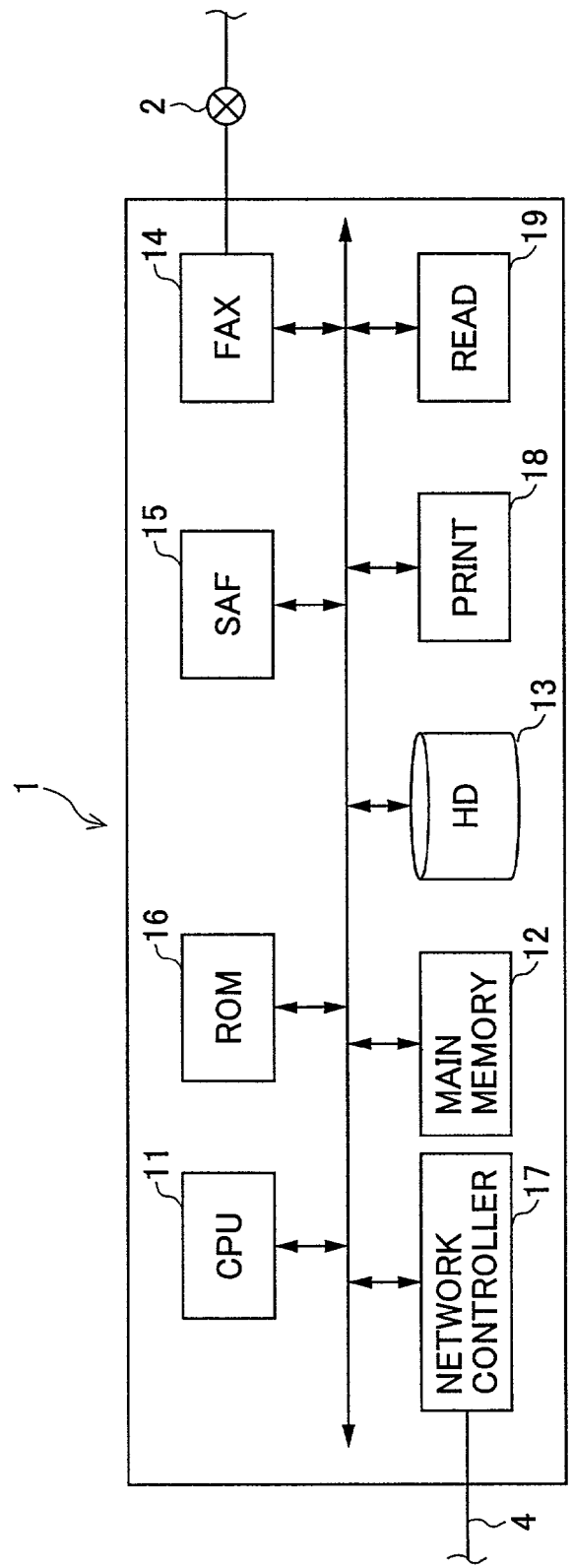
FIG. 2 is a block diagram showing a facsimile apparatus of the present invention.

FIG. 2 is a block diagram showing the facsimile apparatus 1. As shown in FIG. 2, the facsimile apparatus 1 includes a central processing unit 11, a main memory device 12, a hard disk 13, a facsimile communication device 14, a SAF (Store And Forward) memory 15, a ROM (Read Only Memory) 16, a network controller 17, a printing means 18 and a reading (input) means 19.

The central processing unit 11 controls the entire operation of the facsimile apparatus 1. Accordingly, the central processing unit 11 performs a sequence to control the facsimile apparatus 1 and operates facsimile apparatus in accordance with the transmission program of the present invention.

The main memory device 12 constitutes a work area that is used for decompressing received image data and for attaching additional information (metainformation) contained in received communication information to the image data.

The facsimile communication device 14 is responsible for facsimile communications with the facsimile apparatus 3 via the public telephone line 2 and thus serves as a receiving means.

The network controller 17 is responsible for communications such as an FTP (File Transfer Protocol) communication with the server apparatus via the network 4 and thus serves as a network communication means.

The SAF memory 15 power supply is backed up by a battery. The SAF memory 15 is a storage device that can be used for high-speed fowarding and that has a small storage capacity. The SAF memory 15 stores data received through the public telephone line 2. In the present embodiment, the SAF memory 15 constitutes a primary storage means.

The hard disk 13 is a memory having a storage capacity that is greater than that of the SAF memory 15. In the present embodiment, the hard disk 13 constitutes a secondary storage means. When the network controller 17 detects a status indicating that the server apparatus 5 is communicating with another apparatus, the system may be in a state where communications cannot be established between the facsimile apparatus 1 and the server apparatus 5. If it is then attempted to continue storing data into the SAF memory 15, the central processing unit 11 determines whether the SAF memory 15 will overflow and subsequent facsimile documents cannot be received. If the SAF memory will overflow, the central processing unit 11 submits an instruction for the image data stored in the SAF memory 15 together with the communication information to be saved on the hard disk 13.

Next, the data saved on the hard disk 13 is deleted from the SAF memory 15 in accordance with an instruction from the central processing unit 11.

Also, the central processing unit 11 converts the image data stored in the SAF memory 15 or on the hard disk 13 into standard format image data and forwards it to the main memory device 12 where the image data is modified by adding communication information to generate transmission data. Accordingly, the central processing unit 11 together with the main memory device 12 serve as a forwarding means.

Further, the central processing unit 11 modifies the image data saved on the hard disk 13 in a manner described above and retransmits the data to the server apparatus 5. If the retransmission of the data fails, retransmission is repeated. Accordingly, the central processing unit 11 serves as a retransmission means.

The ROM 16 stores a transmission program for operating the central processing unit 11, which will be described later with reference to a flowchart. Accordingly, the ROM 16 serves as a recording medium. It is to be noted that the recording medium is not limited to the ROM 16, but may be a CD (Compact Disk), a floppy disk, a DVD (Digital Versatile Disk) or an MD (Mini Disk).

The printing means 18 may be, for example, a thermal recording device using thermal elements or an electrophotographic recording device using a photosensitive drum and toner. The printing means 18 records the image data, for example, on recording sheets or recording paper.

The reading means 19 may be, for example, an image scanner using image-capturing means such as CCDs (Charge Coupled Devices). The reading means 19 operates in accordance with the instructions submitted from the central processing unit 11. The reading means 19 scans the original material and reads the image data of the original material at a predetermined resolution.

Figure 3:
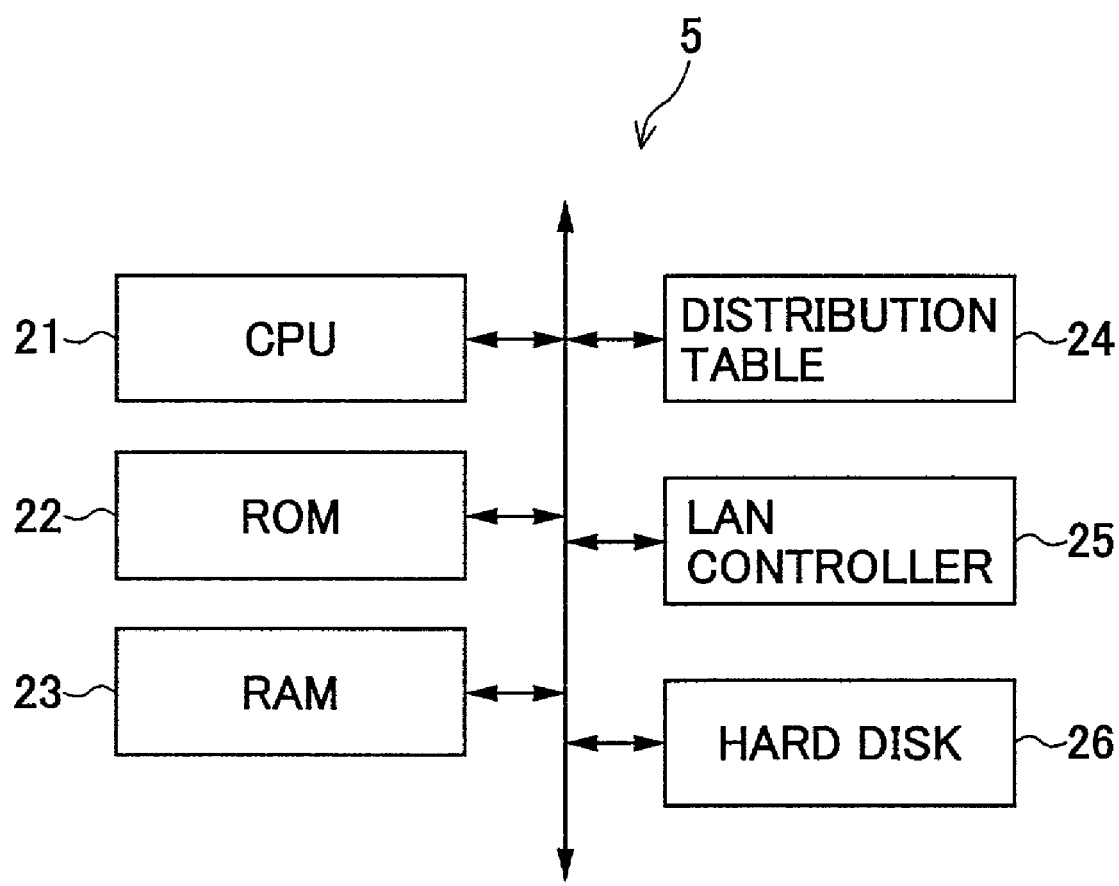
FIG. 3 is a block diagram showing a server apparatus of the present invention.

FIG. 3 is a block diagram showing the server apparatus 5. The server 5 includes a CPU 21, a ROM 22, a RAM (Random Access Memory) 23, a distribution table 24, a LAN controller 25 and a hard disk 26.

The CPU 21 controls the entire server apparatus 5 and performs operations such as an e-mail address acquiring operation of the present embodiment.

The ROM 22 is a memory in which control procedures conforming to H. 323 and Network 4 are stored.

The RAM 23 is a memory which is used during a network controlling operation. The RAM 23 is used for temporarily storing the required data or performing protocol processes conforming to Network 4.

The distribution table 24 stores confidential IDs or F-codes of distribution entries of the addressees. The CPU 21 compares the confidential ID or the F-code contained in the communication information received from the facsimile apparatus 1 with the confidential IDs or the F-codes stored in the distribution table 24. If a matching distribution entry is found, an e-mail address is retrieved from the distribution destination information of the distribution entry. The standard format image data received from the facsimile apparatus 1 and the additional information are used to generate an e-mail message which is distributed to an apparatus such as the client PC 6.

The hard disk 26 is a mass storage device in which the distribution data and the communication data received from the facsimile apparatus 1 are stored.

Figure 4:
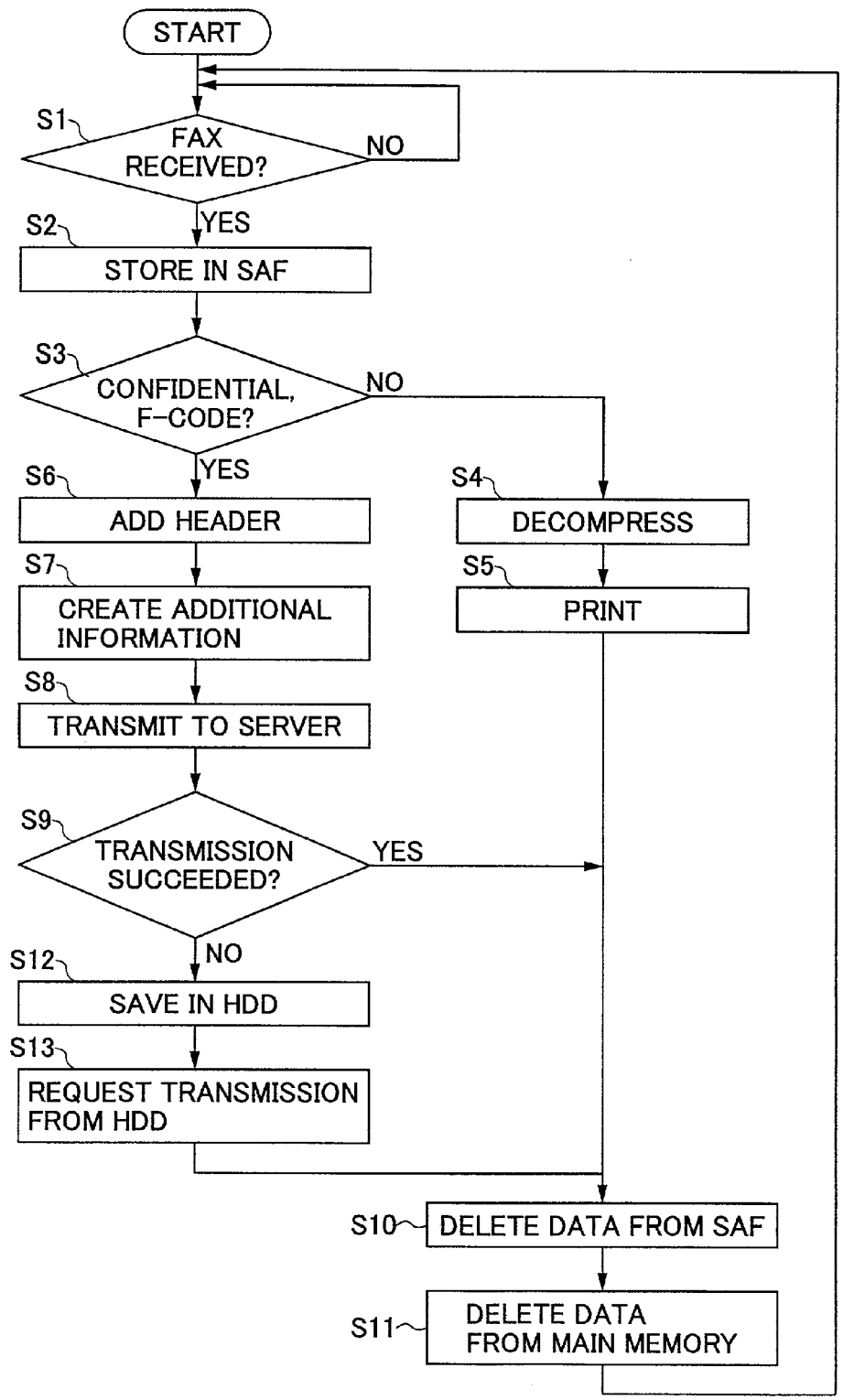
FIG. 4 is a flowchart of a transmission process of facsimile documents received by the facsimile apparatus according to the present invention.
Figure 5:
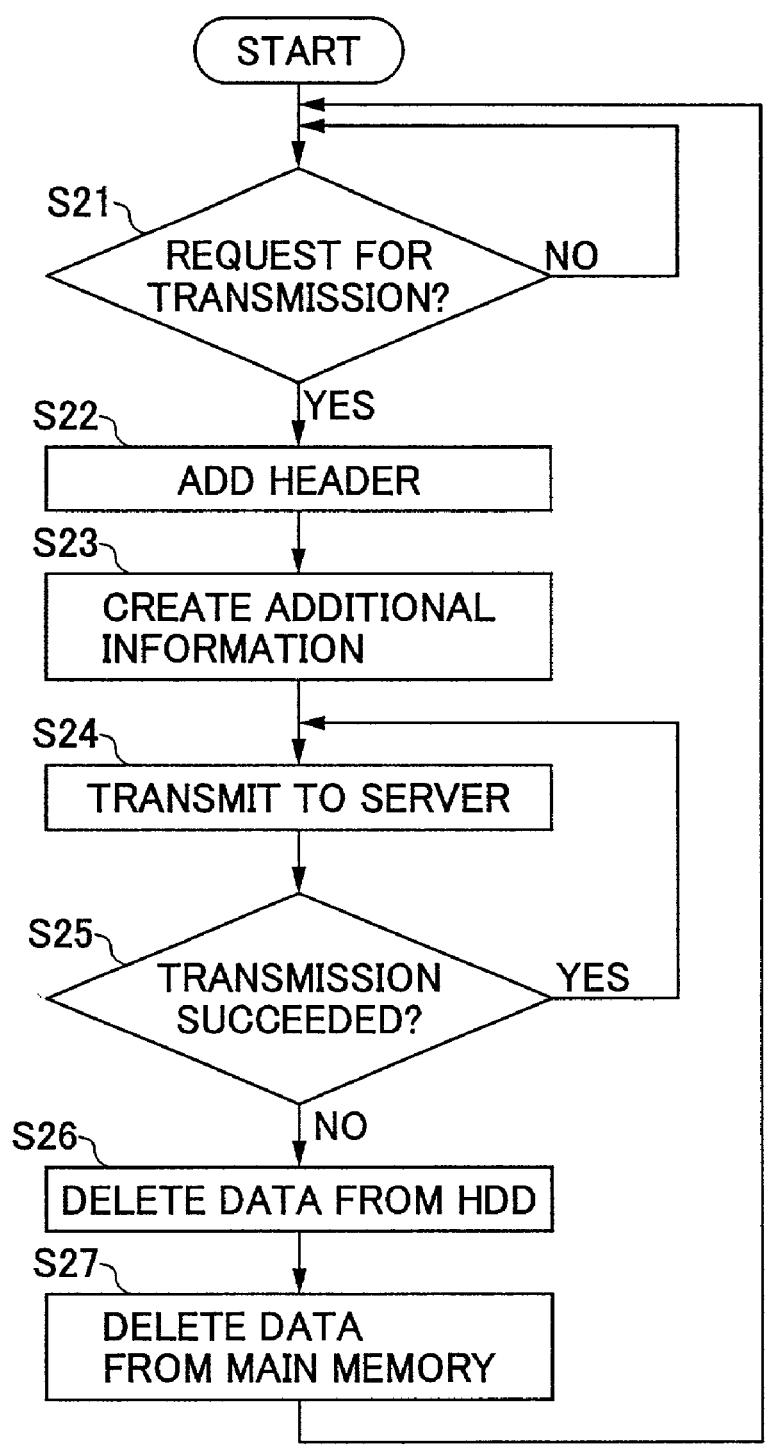
FIG. 5 is a flowchart of a transmission request process from the facsimile apparatus to the server apparatus according to the present invention.

FIGS. 4 and 5 are flowcharts showing transmission programs stored in the ROM 16 and used for operating the central processing unit 11.

Referring to FIG. 4, a process of transmitting the data received from the facsimile apparatus 3 to the server apparatus 5 will be described.

First, the facsimile apparatus 1 determines whether the facsimile document has been received as image data from the facsimile apparatus 3 of the other party (step S1). If so, the image data of the facsimile document and the communication information are stored in the SAF memory 15 (step S2).

Then, the stored communication information is used to determine whether the received facsimile document is a confidential communication or an F-code communication (step S3). If the received facsimile document is neither a confidential communication nor an F-code communication, the facsimile document stored in the SAF memory 15 is decompressed in the main memory device 12. Then the decompressed image data are printed on the recording paper by the printing means 18 (steps S4 and S5).

If it is determined in step S3 that the received facsimile document is a confidential communication or an F-code communication, a header of a standard format, for example a TIFF (Tag Image File Format) header, is added to the facsimile document stored in the SAF memory 15. Then the facsimile document accompanied by the header is forwarded to the main memory device 12 (step S6). Additional information (meta-information) of the image data is produced from the communication information in the SAF memory 15 and forwarded to the main memory device 12 (step S7).

Then, the standard format image data and the additional information (meta-information) stored in the main memory device 12 are transmitted to the server apparatus 5 using FTP via the network controller 17 and the network 4 (step S8). Subsequently, it is determined whether the transmission has succeeded (step S9). If so, the image data and the communication information in the SAF memory 15 are deleted and that storage area of the SAF 15 is freed (step S10). Further, the standard format image data and the additional information (meta-information) in the main memory device 12 are deleted and that storage area of the main memory device 12 is freed (step S11).

If it is determined in step S9 that the transmission has not succeeded, the image data and the communication data in the SAF memory 15 are saved on the hard disk 13 (step S12). Then, a request is submitted for the image data and the communication information saved on the hard disk 13 to be retransmitted to the server apparatus 5 (step S13).

A program for requesting transmission of the image data and the communication information is described with reference to a flow chart shown in FIG. 5. As shown in FIG. 5, in the process of transmitting the image data and the communication data stored on the hard disk 13 to the server apparatus 5, first, it is determined whether a transmission request has been submitted (step S21). If so, a header of the standard format, for example a TIFF header, is added to the image data saved on the hard disk 13 and is forwarded to the main memory device 12 (step S22). Additional information (meta-information) of the image data is produced from the communication information saved on the hard disk 13 and then forwarded to the main memory device 12 (step S23).

Then, the standard format image data and the additional information (meta-information) stored in the main memory device 12 are transmitted to the server apparatus 5 using an FTP via the network controller 17 and the network 4 (step S24).

Subsequently, it is determined whether the transmitting step has succeeded (step S25). If so, the image data and the communication information saved on the hard disk 13 are deleted (step S26). Further, the standard format image data and the additional information (meta-information) in the main memory device 12 are deleted and that storage area of the main memory device 12 is freed (step S27).

Referring to a flowchart shown in FIG. 6, a distribution operation of the server apparatus 5 will be described.

Figure 6:
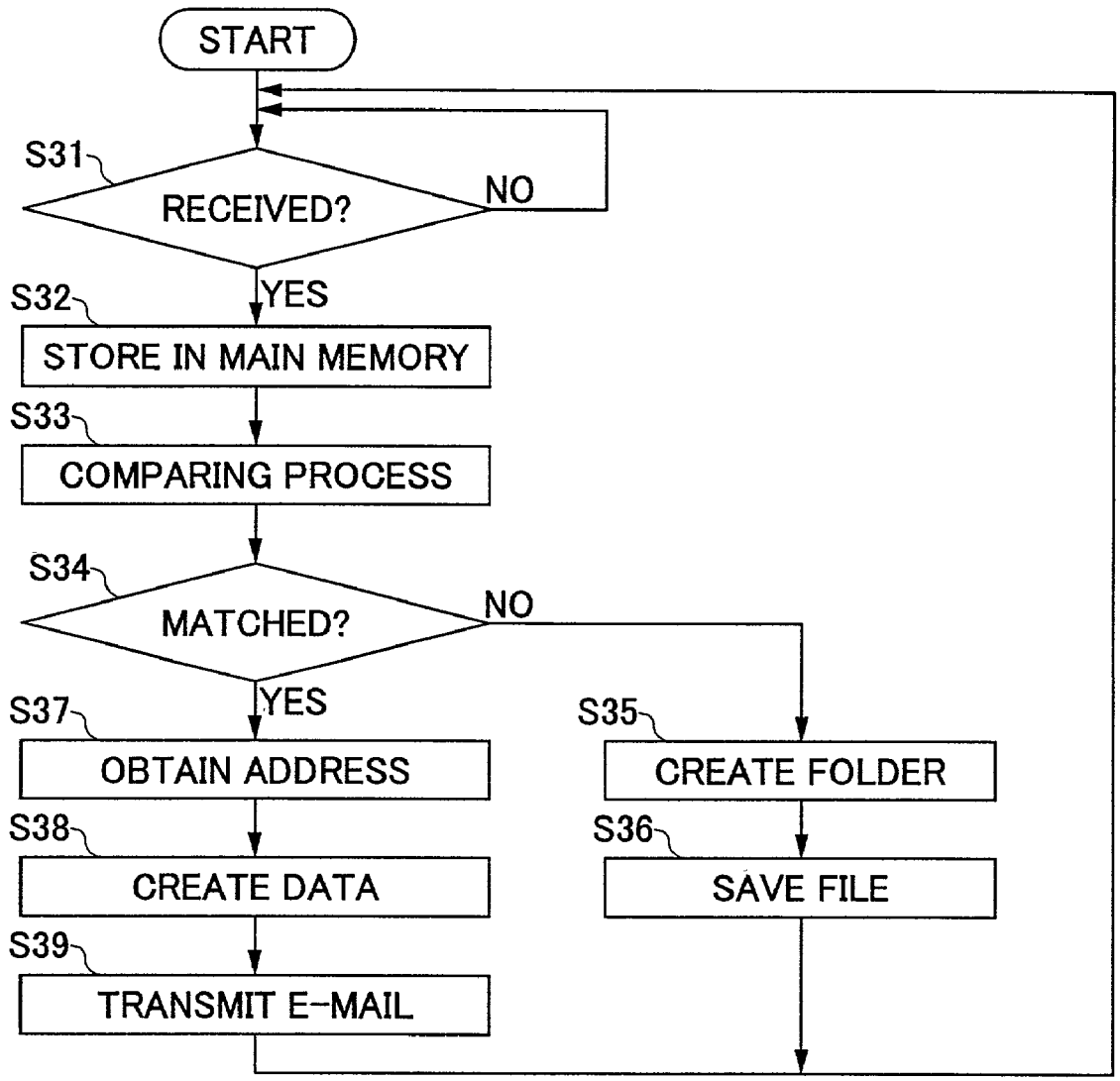
FIG. 6 is a flowchart of a distributing process of the server apparatus of the present invention.

As shown FIG. 6, the server apparatus 5 waits for a reception of the standard format image data and the additional information (meta-information) from the facsimile apparatus 1 via the network 4 (step S31). Upon reception, the standard format image data and the additional information are temporarily stored in the main memory device 12 (step S32).

It is to be noted that as shown in FIG. 7, a distribution table 24 stores confidential IDs 31 (here, 0123 and 1234 are distribution entries corresponding to the confidential ID and F-codes 32, and 1234567, 1111111 and 09876543 are distribution entries corresponding to the F-code for each of the distribution entries. Referring again to FIG. 6, the confidential ID 31 or the F-code 32 of the distribution entry of the distribution table 24 are compared with the confidential ID or the F-code contained in the received communication information (step S33). Then, it is determined whether any distribution entry with matching confidential ID or F-code is registered in the distribution table 24 (step S34). If there is no matching distribution entry, a new folder is created at a location under the predetermined folder based on reception time information of the image data and the additional information (step S35). In the newly created folder, the standard format image data and the additional information are stored as a file (step S36).

If it is determined in step S34 that there is a matching distribution entry, an e-mail address is obtained from the distribution information of the distribution entry (step S37). Then, an e-mail message is created from the standard format image data and the additional information (step S38). Then, the created e-mail message is transmitted to the obtained e-mail address (step S39).

It is to be noted that in the distribution table of FIG. 7, for example, when the confidential ID contained in the received communication information matches the distribution entry "0123" of the confidential ID stored in the distribution table 24, the e-mail message is transmitted to an e-mail address "aaa@xxx.yyy.co.jp" which may be the client PC 6.

Thus, according to the present embodiment, the image data is transmitted together with the communication information such as the confidential ID to the server apparatus 5 via a fast network 4 and is distributed from the server apparatus 5 to individuals using an e-mail message. When the transmission of the image data to the server apparatus 5 fails, the image data stored in the SAF memory 15 is saved on a mass storage hard disk 13 and the image data in the SAF memory 15 is deleted. Thus, the storage area on the SAF memory 15 is freed. Therefore, subsequent data can be received in a reliable manner and when communication with the server apparatus is possible, the image data stored on the hard disk 13 can be converted to the standard format image data and can be immediately transmitted together with the communication information to the server apparatus 5.

Also, since the primary storage means is embodied as the SAF memory 15 and the secondary storage means is embodied as the hard disk 13, the image data can be transmitted together with the communication information at a high speed to the server apparatus 5 via the fast network 4.

Further, the present invention is not limited to these embodiments, and variations and modifications may be made without departing from the scope of the present invention.

The present application is based on Japanese priority application No. 2001-023605 filed on Jan. 31, 2001, the entire contents of which are hereby incorporated by reference.

What is claimed is:

1. A communication apparatus comprising:

receiving means for receiving a plurality of image data and accompanying communication information;

primary storage means for temporarily storing said image data and communication information, said primary storage means being adapted for high-speed forwarding;

secondary storage means having a storage capacity greater than that of said primary storage means;

forwarding means for converting said image data to a standard format and forwarding said standard format image data together with said communication information;

network communication means connected to a server apparatus via a network for transmitting said standard format image data together with said communication information to said server apparatus; and retransmitting means operable in case of a failure of transmission, wherein said retransmitting means saves said image data and communication information stored in said primary storage means in said secondary storage means, deletes said image data from said primary storage means, converts the saved image data into a standard format, retransmits the standard format image data together with said communication information to said server apparatus and repeats retransmission in case of a failure of the preceding retransmission.

2. The communication apparatus as claimed in claim 1, wherein said primary storage means is an SAF (Store And Forward) memory and said secondary storage means is a hard disk.

3. A computer readable medium storing a program for transmitting image data to a server apparatus, said program causing a computer to function as:

receiving means for receiving a plurality of image data and accompanying communication information;

primary storage means for temporarily storing said image data and communication information, the primary storage means being adapted for high-speed forwarding;

secondary storage means having a storage capacity greater than that of said primary storage means;

forwarding means for convening said image data to a standard format and forwarding said standard format image data together with said communication information;

network communication means connected to a server apparatus via a network for transmitting said standard format image data together with said communication information to said server apparatus; and retransmitting means operable in case of a failure of transmission, wherein said retransmitting means saves said image data and communication information stored in said primary storage means in said secondary storage means, deletes said image data from said primary storage means, converts the saved image data into a standard format, retransmits the standard format image data together with said communication information to said server apparatus and repeats retransmission in case of a failure of the preceding retransmission.

4. A method of transmitting image data to a server apparatus using a preprogrammed computer, said method comprising the steps of:

receiving image data and accompanying communication information;

storing said image data and communication information in a primary storage means adapted for a high-speed forwarding;

converting said image data to a standard format and forwarding said standard format image data together with said communication information;

carrying out network communications for transmitting said standard format image data together with said communication information to said server apparatus via a network;

in case of a failure of transmission, saving said image data and communication information stored in said primary storage means in a secondary storage means having a storage capacity greater than that of said primary storage means and deleting said image data in said primary storage means; and converting the saved image data into a standard format, retransmitting the standard format image data together with said communication information to said server apparatus and repeating retransmission in case of a failure of the preceding retransmission.

* * * * *